UNITED STATES PATENT OFFICE.

JOSEPH W. FINERTY, OF MILFORD, NEW HAMPSHIRE.

STONE-CLEANING COMPOSITION.

SPECIFICATION forming part of Letters Patent No. 606,759, dated July 5, 1898.

Application filed October 26, 1896. Serial No. 610,081. (No specimens.)

*To all whom it may concern:*

Be it known that I, JOSEPH W. FINERTY, of Milford, in the county of Hillsborough and State of New Hampshire, have invented certain new and useful Improvements in Cleansing Compounds for Granite, of which the following is a specification.

My invention contemplates new and useful improvements in cleansing compounds for granite and marble and the like.

The object of my invention is to produce a simple and inexpensive compound for removing all acid, dirt, and iron stains, as well as discolorations, from granite or marble, also for cleaning monuments that have become mossy or stained from exposure to the weather or the drippings from trees, and also for cleaning the exterior of buildings.

My compound will not of itself stain or discolor granite or marble.

In carrying out my invention I employ the following ingredients: oxalic acid, one pound; chlorid of lime, one pound; nitric acid, two drams; water, twelve ounces, mixed and made into a paste.

In the manufacture of this paste or compound I mix the oxalic acid and chlorid of lime together and thoroughly pulverize. I then mix the water and nitric acid and add to the oxalic acid and chlorid of lime, all being mixed together until they form a homogeneous paste, in which form it is put up for use.

The paste is applied to the surface to be cleansed and allowed to remain until it has thoroughly drawn out the discolorations, when it is removed by washing with a brush.

I am aware that some of the ingredients mentioned have been used in conjunction with other agencies in cleansing compounds; but I am not aware that before my invention the composition of matter herein shown and described had been known and used as a cleansing compound for granite or marble.

The chief ingredient or base of my compound is nitric acid. This element and the oxalic acid constitute the cleansing agent, which, in connection with the other ingredients, make a perfectly harmless cleaning paste for granite and marble. It will quickly and effectively draw out iron and other stains without any injury to the surface to which the paste is applied.

I claim as my invention—

As a material for removing stains and discolorations from granite, marble, and the like, the composition resulting from the admixture of oxalic acid and chlorid of lime, and the addition thereto of nitric acid diluted with water, all in about the proportions specified, when combined to form a homogeneous paste, substantially as and for the purpose described.

In testimony whereof I have signed my name to this specification, in the presence of two subscribing witnesses, this 8th day of July, A. D. 1896.

JOSEPH W. FINERTY.

Witnesses:
R. P. ELLIOTT,
K. C. BROOK.